US012221831B2

(12) United States Patent
Wuestner

(10) Patent No.: US 12,221,831 B2
(45) Date of Patent: Feb. 11, 2025

(54) HIGH PERFORMANCE DOOR

(71) Applicant: Assa Abloy Entrance Systems AB, Landskrona (SE)

(72) Inventor: Helmut Wuestner, Lippstadt (DE)

(73) Assignee: Assa Abloy Entrance Systems AB, Landskrona (SE)

( * ) Notice: Subject to any disclaimer, the term of this patent is extended or adjusted under 35 U.S.C. 154(b) by 340 days.

(21) Appl. No.: 17/620,584

(22) PCT Filed: Jun. 17, 2020

(86) PCT No.: PCT/EP2020/066679

§ 371 (c)(1),
(2) Date: Dec. 17, 2021

(87) PCT Pub. No.: WO2020/260078

PCT Pub. Date: Dec. 30, 2020

(65) Prior Publication Data

US 2022/0316268 A1 Oct. 6, 2022

(30) Foreign Application Priority Data

Jun. 24, 2019 (SE) .................................... 1930218-1

(51) Int. Cl.
*E06B 9/58* (2006.01)
*E06B 9/13* (2006.01)
(Continued)

(52) U.S. Cl.
CPC ............ *E06B 9/17046* (2013.01); *E06B 9/13* (2013.01); *E06B 9/171* (2013.01); *E06B 9/58* (2013.01)

(58) Field of Classification Search
CPC ... E06B 9/171; E06B 9/13; E06B 9/58; E06B 9/17046
See application file for complete search history.

(56) References Cited

U.S. PATENT DOCUMENTS 3,078,917 A 2/1963 Recchione
3,522,834 A * 8/1970 Corcoran .................. E06B 9/68 160/279

(Continued)

FOREIGN PATENT DOCUMENTS

CN 101443524 5/2009
CN 2039058768 10/2014

(Continued)

OTHER PUBLICATIONS

Chinese Office Action for 2023112500032290, dated Nov. 25, 2023.

(Continued)

*Primary Examiner* — Johnnie A. Shablack
(74) *Attorney, Agent, or Firm* — Wissing Miller LLP

(57) ABSTRACT

A high performance door, preferably a high speed door opens and closes an opening (11), preferably in a wall (12). The door includes a flexible curtain (13) that is wound and unwound on a shaft to open and close the opening (11). The door includes a rigid bottom beam (15) attached on the lower end of said curtain (13). The risk that the bottom beam may contact an object the environment surrounding the door upon opening is reduced by the shape of the rigid bottom beam (15). The rigid bottom beam is shaped to have at least one flush side (20) that is flush with the curtain and another side that is almost flush with the curtain (13).

11 Claims, 3 Drawing Sheets

Figure 1:
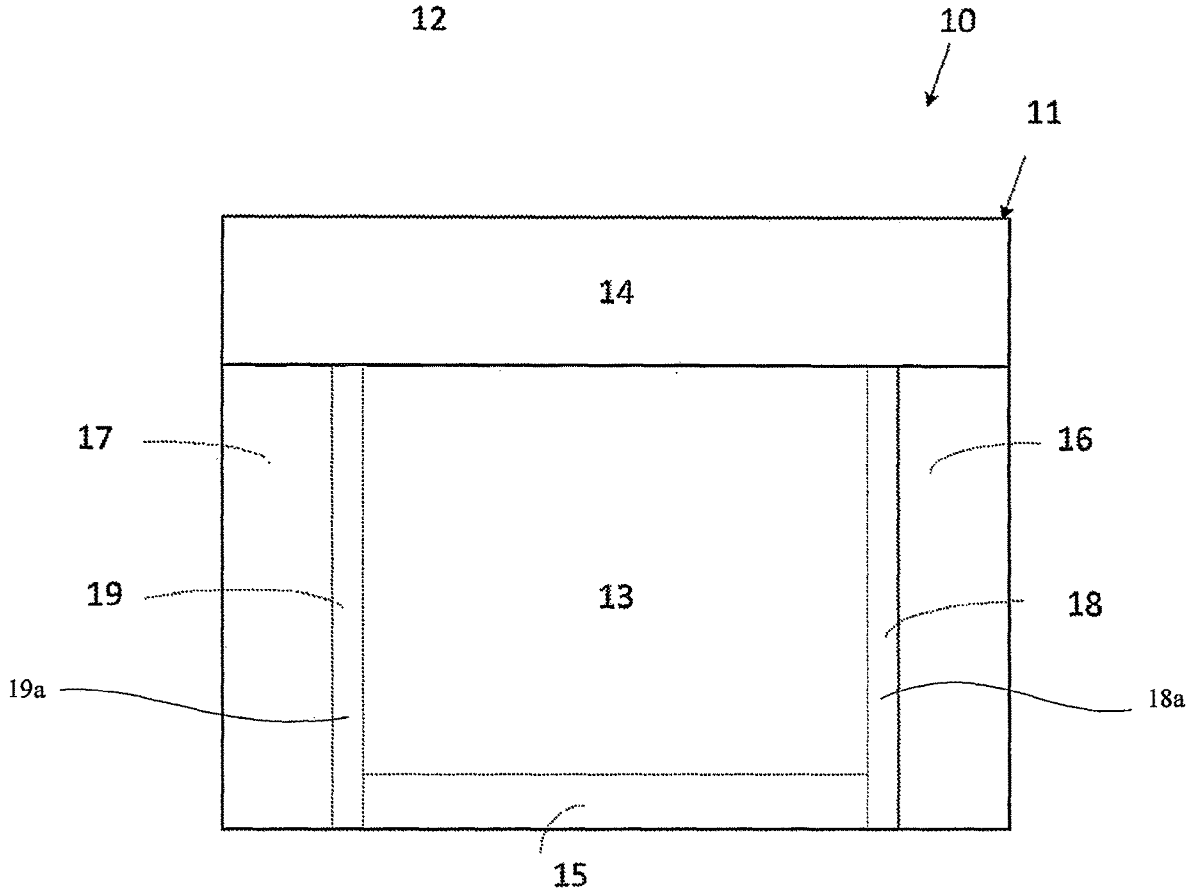

(51) Int. Cl.
*E06B 9/17* (2006.01)
*E06B 9/171* (2006.01)

(56) References Cited

U.S. PATENT DOCUMENTS

| | | | | | |
|---|---|---|---|---|---|
| 3,882,921 | A * | 5/1975 | Sandall | E06B 9/24 | 160/242 |
| 4,357,978 | A * | 11/1982 | Keller | E06B 9/17076 | 160/271 |
| 4,452,294 | A * | 6/1984 | Fukuchi | E06B 9/17046 | 160/395 |
| 5,009,540 | A * | 4/1991 | Nolan | F16B 5/0692 | 160/395 |
| 5,078,197 | A * | 1/1992 | Weishar | E06B 9/13 | 160/133 |
| 5,222,541 | A | 6/1993 | Hornberger | | |
| 5,482,104 | A * | 1/1996 | Lichy | E06B 9/13 | 160/273.1 |
| 5,547,241 | A * | 8/1996 | Villella | B60J 5/08 | 296/24.45 |
| 6,978,821 | B2 * | 12/2005 | Welfonder | E06B 9/17046 | 160/395 |
| 7,516,770 | B2 * | 4/2009 | Jerry | E06B 9/13 | 160/267.1 |
| 8,291,960 | B2 * | 10/2012 | Bowman | E06B 9/17046 | 160/267.1 |
| 8,607,842 | B2 * | 12/2013 | Drifka | E06B 9/13 | 160/266 |
| 8,820,386 | B2 * | 9/2014 | Mullet | E06B 9/40 | 160/241 |
| 9,382,752 | B1 | 7/2016 | Zubay | | |
| 9,410,368 | B2 | 8/2016 | Drifka | | |
| 9,512,669 | B2 * | 12/2016 | Šentjurc | E06B 9/13 | |
| 9,637,972 | B2 * | 5/2017 | Miller | E06B 9/88 | |
| 10,844,657 | B2 * | 11/2020 | Fleischman | E06B 9/581 | |
| 10,934,772 | B2 * | 3/2021 | Healam | E06B 9/42 | |
| 10,968,691 | B2 * | 4/2021 | Przydzial | E06B 9/0692 | |
| 11,131,090 | B2 * | 9/2021 | Klein | E06B 9/174 | |
| 11,215,008 | B2 * | 1/2022 | Blair | A47H 23/01 | |
| 11,421,474 | B2 * | 8/2022 | James | E06B 9/00 | |
| 11,643,869 | B2 * | 5/2023 | Menendez | E06B 9/17076 | 160/238 |
| 2004/0107655 | A1 | 6/2004 | Hudoba | | |
| 2004/0144498 | A1 | 7/2004 | Hudoba | | |
| 2006/0225850 | A1 * | 10/2006 | Schweitzer | E06B 9/58 | 160/310 |
| 2007/0284051 | A1 | 12/2007 | Grimes et al. | | |
| 2008/0196842 | A1 * | 8/2008 | Schoeren | E06B 9/581 | 160/133 |
| 2012/0061034 | A1 * | 3/2012 | Ng | E06B 9/42 | 160/290.1 |
| 2014/0069594 | A1 | 3/2014 | Drifka | | |
| 2017/0356239 | A1 | 12/2017 | Ouyang et al. | | |
| 2018/0313146 | A1 | 11/2018 | Blair | | |
| 2019/0336801 | A1 * | 11/2019 | Edwards | E06B 9/17007 | |
| 2021/0025211 | A1 * | 1/2021 | Dickson | E06B 9/17046 | |
| 2023/0366268 | A1 * | 11/2023 | Heissenberg | E06B 9/54 | |

FOREIGN PATENT DOCUMENTS

| | | |
|---|---|---|
| CN | 105936207 | 9/2016 |
| CN | 208718553 | 4/2019 |
| DE | 2611563 | 9/1977 |
| IT | PD20110136 | 11/2012 |
| JP | 2014189075 | 10/2014 |
| WO | 9820778 | 5/1998 |

OTHER PUBLICATIONS

International Search Report and Written Opinion in PCT/EP2020/066679 mailed Sep. 24, 2020.
Swedish Search Report in 1930218-1 mailed Nov. 28, 2019.

* cited by examiner

HIGH PERFORMANCE DOOR

This application is a 371 of PCT/EP2020/066679, filed on Jun. 17, 2020, published on Dec. 30, 2020 under publication number WO 2020/260078, which claims priority benefits from Swedish Patent Application No. 1930218-1, filed on Jun. 24, 2019, the disclosure of which is incorporated herein by reference.

The invention relates to a high performance door, preferably a high speed door, for closing an opening preferably in a wall, comprising a flexible curtain to be wound and unwound on a shaft to open and close the opening with a rigid bottom beam attached on the lower end of said curtain.

As is well-known for the skilled person, a high performance door is a roll up door, which preferably may be a high speed door (a type of roll up door which enables faster roll up of the wound flexible curtain).

Such kind of doors are causing a risk for its environment, e.g. operator, or other persons when opening. The main reason is, that the rigid bottom beam is thicker than the flexible door curtain. This is necessary to fulfill the requirements of a rigid bottom beam, e.g. costs, stiffness, height of bottom beam, material, fixation of parts. Thus, the bottom beam is overhanging the flexible curtain in both directions of thickness.

To reduce the risk for the environment, e.g. operator or other persons, the top-shape of the rigid bottom beam avoids sharp edges and has a big radius and/or a big bevel. The rigid bottom beam is made as thin as possible, and, not more thick than really needed, considering costs, material, height stiffness of bottom beam.

But, even if the top-shape of the rigid bottom beam avoids sharp edges and has a big radius and/or a big bevel, the rigid bottom beam is overhanging the flexible curtain in both directions of thickness. Thus, the overhanging rigid bottom beam can hit its environment, e.g. the operator of the door or other persons upon opening of the door.

The problem to be solved by the invention is to reduce the risk from the bottom beam to the environment upon opening.

The problem is solved with a high performance door of the afore mentioned kind in, that the rigid bottom beam comprising at least one flush side at least almost flushing the curtain.

Thus, the rigid bottom beam is not overhanging the flexible door curtain significantly on one side. Moreover, one side the rigid bottom beam is at least almost flush to the flexible door curtain. Furthermore, the rigid bottom beam may still fulfill the requirements of the door, although if the rigid bottom beam is not overhanging the curtain on one side. Since the rigid bottom beam is not overhanging the flexible curtain on one side, the risk for the environment, e.g. operator or other person, upon opening is reduced significantly at least at this one side. Still the rigid bottom beam may fulfil its requirements, e.g. costs, stiffness, thickness, height.

One preferred embodiment of the invention is characterized in, that the rigid bottom beam is detachably connected to said curtain. This eases attachment of the bottom beam.

Another preferred embodiment of the invention is characterized in, that said rigid bottom beam comprising an off center opening, preferably longitudinal slit for receiving said curtain. Accordingly, the curtain can be assembled in the slit for mounting. This simplifies mounting. Thus, said off center opening may be disposed at an offset distance from a longitudinal centerline of the bottom beam. Said longitudinal centerline extending along the bottom beam. The off center opening may extend parallel to said longitudinal centerline.

Yet another embodiment of the invention is characterized in, that adjacent to said off center opening there are arranged one, preferably two opposite protrusions for retaining a thickening at the lower end of said curtain. This leads to a more precise and still easy positioning of the curtain in the slit, wherein the thickening just has to be position between the protrusions opposite to the curtain to mount and fix the curtain to the rigid bottom beam.

Still another embodiment of the invention is characterized in, that said thickening is made by gluing, molding and/or crimping a, preferably longitudinal, strip on one or both side of said curtain. This gives a simple, cheap and stable construction.

It is of advantage, if the invention is characterized in guiding means assigned to one or both side ends of the curtain for substantially vertically guiding said curtain and preferably said bottom beam upon its up and down movement for opening and closing said opening. This stabilizes the curtain and prevents the rigid bottom beam from being tilted.

A high performance door preferably high speed door, is provided for closing an opening (11), preferably in a wall (12) comprising a flexible curtain (13) to be wound and unwound on a shaft to open and close the opening (11) with a rigid bottom beam (15) attached on the lower end of said curtain (13) characterized in, that the rigid bottom beam (15) comprising at least one flush side (20) at least almost flushing the curtain (13) and comprising guiding means (18, 19) assigned to one or both side ends of the curtain (13) for substantially vertically guiding said curtain (13) and preferably said bottom beam (15) upon its up and down movement for opening and closing said opening (11), characterized in, that said guiding means comprising bearing 18*a*, 19*a*, as shown in FIG. 3. Each bearing may be a slide bearing, preferably from synthetic resin material, a roller bearing, or a ball bearing. As shown in the cross section in FIG. 3, bearings 18*a*, 19*a* are positioned between respective profiles 18, 19 and curtain 13 to reduce friction reliably.

Another embodiment of the invention is comprising sliders, preferably from synthetic resin material. This gives a stable construction with very little friction.

Still another embodiment of the inventions is characterized in, that said guiding means comprising at least one cord, wire, rod and/or one profile comprising a channel. This gives proper guidance with easy construction.

A further embodiment of the invention is comprising biasing means for biasing said curtain and/or said rigid bottom beam downwards to accelerate operation. Accordingly, closing speed is not restricted by gravity.

Another preferred embodiment of the invention is comprising a sealing at the lower end of the rigid bottom beam. This ensure a better closure and insulation of the door.

Yet another embodiment of the invention is characterized in, that said sealing comprising a fastening section, preferably with a T-shape, for cooperative connection with a channel at the lower end of the rigid bottom beam, said channel comprising a C-shape. This makes fastening of the sealing to the rigid bottom beam very easy.

Figure 2:
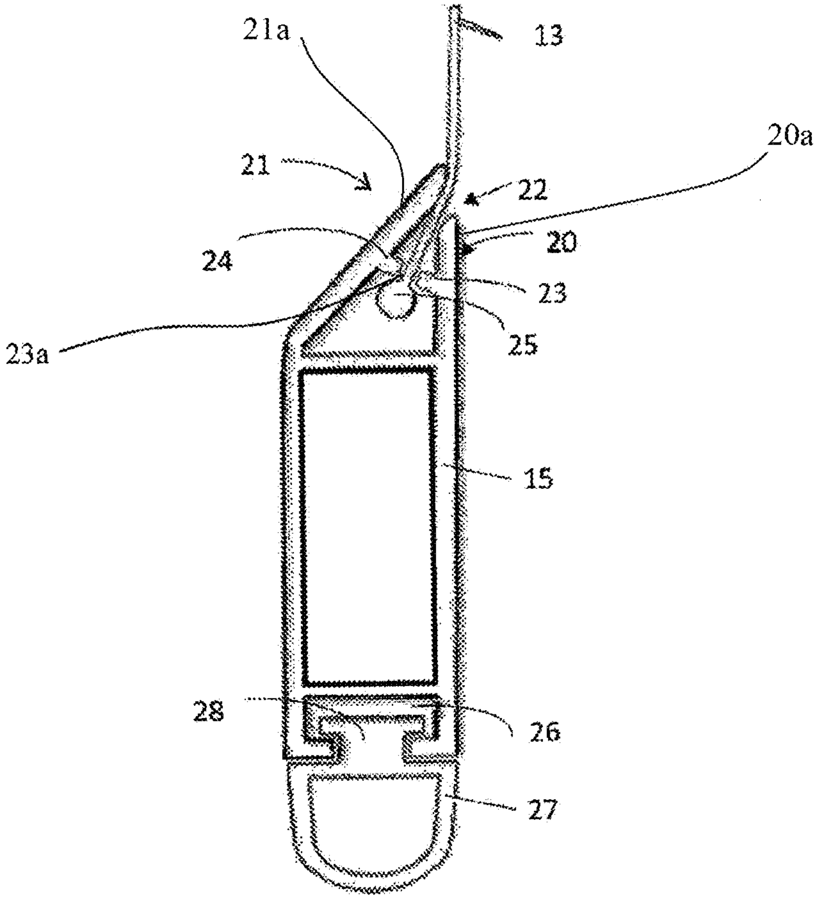
Figure 3A:
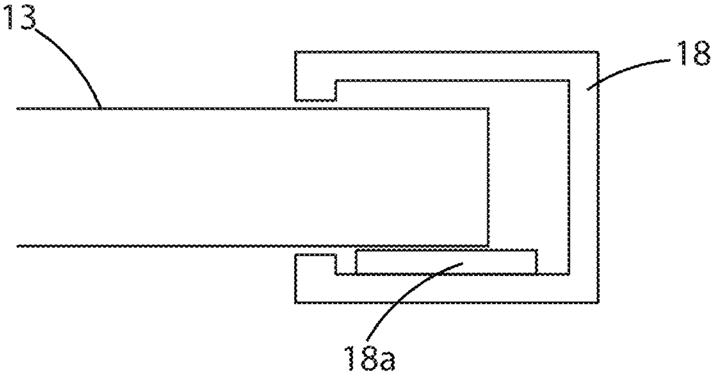
Figure 3B:
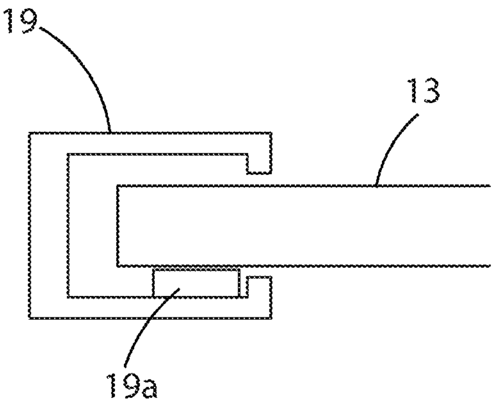

In the following an embodiment of the invention is described using the figures for illustration. The Figures show:

FIG. 1 a front view of a high performance door as an embodiment of the invention, and FIG. 2 a sectional view of a curtain and a rigid bottom beam of the door of FIG. 1, and FIGS. 3A and 3B shows cross sections of profiles of the door of FIG. 1.

FIG. 1 shows a front view of a high performance door 10 as an embodiment of the invention. As can be seen, the door 10 serves to close an opening 11 in a wall 12 of a building or the like. Preferably, this kind of door 10 is used to open access to machines, thus, the opening 11 can be the opening in a door frame of a fence instead of the wall 12. The door 10 comprises a flexible curtain 13 to close the opening. On the upper end of the opening a housing 14 is positioned. Within the housing 14 a not shown shaft is rotatably mounted. The curtain 13 is at its upper end fixed to the shaft and the shaft is driven by a not shown motor to wound and unwound the curtain 13 to open and close the opening 11. At the lower end of the curtain 13 a rigid bottom beam 15 is attached to smoothen the curtain 13 and to pull the curtain downwardly upon unwinding from the shaft.

The curtain 13 can be of any suitable material as fabric, sheet material, foam or the like. It may have insulating properties regarding to noise or heat if required. The rigid bottom beam 15 can be manufactured as a hollow profile or solid. The properties as height, thickness, weight and the like can be chosen as required.

As can be seen further from FIG. 1 the housing is carried by two supports 16, 17 on opposite ends of the opening 11. The supports 16, 17 are frames 16, 17 in the shown embodiment. At the inner sides of the frames 16, 17 facing to the curtain 13 and facing towards profiles 18, 19 are mounted to guide the curtain 13. The profiles 18, 19 are of C-shape with a longitudinal channel thereof to one another. According to one embodiment, profiles 18, 19 comprise guiding means such as bearings or sliders 18*a*, 19*a*. The curtain 13 comprises (not shown) sliding bricks guided with the respective profile channel to guide the curtain 13 upon opening and closing movement with only little friction.

FIG. 2 shows a sectional view of a curtain 13 and a rigid bottom beam 15 of the door 10 of FIG. 1. The rigid bottom beam 15 comprises two opposite sides 20, 21. One side 20 is a flush side 20 substantially flushing with the curtain 13. The other side 21 is constructed as an oblique side 21 to reduce the risk for its environment, e.g. people. Since the flush side 20 flushes substantially with the curtain 13 there is no risk for the environment at this side upon opening the door 10. Flush wall 20*a* forms at least a portion of flush side 20. Opposing wall 21*a* forms at least a portion of the other side 21. Opposing wall 21*a* extends above the top-most end of flush wall. The topmost end of opposing wall 21*a* contacts flexible curtain 13, displacing beam 15 horizontally so that flush side 20 does not overhang the curtain.

Between the sides 20, 21 there is an opening 22 in the rigid bottom beam 15. Adjacent to the opening 22, but, slightly more inside there are two protrusions 23, 24 facing towards one another. Protrusions 23 and 24 define a gap 23*a*. As can be seen from FIG. 2 at the lower end of the curtain a thickening 25 is mounted. The curtain 13 is shifted with its lower end in the opening 22 and between the protrusions 24, 25 to locate the thickening 25 at the side of the protrusions 23, 24 opposite to the opening 22 with curtain 13 extending through gap 23*a*. By this way the curtain is fixedly mounted in the opening 22 and between the protrusions 23, 24 since the thickening 25 abuts the protrusions 23, 24 and is too thick to pass through between them.

The thickening 25 can be made from any suitable material or can be fixed in any suitable manner to the curtain 13. It can be made e.g. from synthetic resin, steel, alumina, wood or the like. It can be made from one, two or more parts glued, crimped, molded or nailed to the curtain 13. In the shown embodiment the thickening 25 has a circular cross section and is glued to the curtain.

At the lower side of the rigid bottom beam 15 and opposite to the opening 22 the rigid bottom beam comprises a channel 26. The channel 26 has a C-shape cross section. Adjacent to the opening of the C-shape channel 26 there is a sealing 27. The sealing 27 comprises a fastening section 28 adapted to be fastened to the rigid bottom beam. As shown the fastening section 28 is integrally with the sealing a has a T-shape cross section. The T-shape fastening section 28 is received within the C-shape channel 26 for fastening the sealing 27 to the rigid bottom beam. The sealing 27 can be any suitable sealing for noise, airtight or heat insulation purposes or the like as required. Furthermore, the sealing can be of any suitable material, e.g. rubber, plastic, card board, bristle or the like. In the shown embodiment the sealing 27 is made as a profile rubber sealing.

LIST OF REFERENCE NUMBERS

10 door
11 opening
12 wall
13 curtain
14 housing
15 beam
16 support
17 support
18 profile
19 profile
20 flush side
21 oblique side
22 opening
23 protrusion
24 protrusion
25 thickening
26 channel
27 sealing
28 fastening section

The invention claimed is:

1. A high performance door, for closing an opening in a wall, the door comprising a flexible curtain adapted to be wound on a shaft to open the opening and unwound from the shaft to close the opening; a rigid bottom beam attached on the lower end of said curtain wherein the rigid bottom beam comprises a flush side and an opposing side, wherein the bottom beam further comprises:

an opposing wall forming at least a portion of the opposing side and a flush wall forming at least a portion of the flush side, the opposing wall and the flush wall defining a longitudinal slot for receiving the lower end of the curtain, wherein a topmost end of the opposing wall contacts the curtain above the flush wall and flexes the curtain horizontally, and wherein the bottom beam is displaced relative to the curtain so that the flush side does not overhang the curtain; and two opposing protrusions along opposing inner surfaces of the slot defining a gap, wherein the curtain further comprises:

a thickening at the lower end of the curtain, wherein the thickening is provided within the slot below the two protrusions, wherein the thickening is larger than the gap, and wherein the thickening abuts the opposing protrusions.

2. The high performance door according to claim 1, wherein the rigid bottom beam is detachably connected to said curtain.

3. The high performance door according to claim 1, wherein the longitudinal slot is off center of the rigid bottom beam.

4. The high performance door according to claim 1, wherein the thickening further comprises a strip on one or both sides of said curtain.

5. The high performance door according to claim 1, comprising guiding means slideably engaged with one or both sides of the curtain for substantially vertically guiding said curtain and said bottom beam upon its up and down movement for opening and closing said opening.

6. The high performance door according to claim 5, wherein said guiding means comprises a channel.

7. The high performance door according to claim 5, wherein said guiding means comprises a slide bearing, a roller bearing, or a ball bearing.

8. The high performance door according to claim 7, comprising sliders, wherein the sliders further comprise a synthetic resin material.

9. The high performance door according to claim 7, wherein the slide bearing comprises a synthetic resin material.

10. The high performance door according to claim 1, further comprising a sealing at the lower end of the rigid bottom beam.

11. The high performance door according to claim 10, wherein said sealing comprises a fastening section-with a T-shape cross section, for cooperative connection with a channel at the lower end of the rigid bottom beam, said channel comprising a C-shape.

* * * * *